(12) United States Patent
Naruse (10) Patent No.: US 7,181,991 B2
(45) Date of Patent: Feb. 27, 2007

(54) AUTOMOBILE ACCELERATOR AND BRAKE PEDAL DEVICE

(76) Inventor: Masuyuki Naruse, 606, Ohaza Noguchi, Taimei-machi, Tamana-gun, Kumamoto-ken (JP) 869-0222

( * ) Notice: Subject to any disclaimer, the term of this patent is extended or adjusted under 35 U.S.C. 154(b) by 385 days.

(21) Appl. No.: 10/479,076

(22) PCT Filed: May 17, 2002

(86) PCT No.: PCT/JP02/04794

§ 371 (c)(1),
(2), (4) Date: Nov. 24, 2003

(87) PCT Pub. No.: WO02/097550

PCT Pub. Date: Dec. 5, 2002

(65) Prior Publication Data

US 2004/0139818 A1    Jul. 22, 2004

(30) Foreign Application Priority Data

May 25, 2001    (JP) ............................. 2001-156990

(51) Int. Cl.
*G05G 1/14* (2006.01)
(52) U.S. Cl. ...................... 74/512; 74/562.5
(58) Field of Classification Search ................ 74/512, 74/560, 562, 562.5; 477/210, 211, 213
See application file for complete search history.

(56) References Cited

U.S. PATENT DOCUMENTS

| | | | | |
|---|---|---|---|---|
| 1,711,988 A | * | 5/1929 | Brochon | ...................... 477/214 |
| 2,164,921 A | * | 7/1939 | Hoff | ............................ 477/210 |
| 2,707,036 A | * | 4/1955 | Hollub | ........................ 477/214 |
| 3,029,916 A | * | 4/1962 | Luijt | ............................ 477/214 |
| 5,293,976 A | * | 3/1994 | Naruse | ........................ 477/211 |
| 5,558,601 A | * | 9/1996 | Naruse | ........................ 477/213 |

FOREIGN PATENT DOCUMENTS

| | | |
|---|---|---|
| FR | 1245546 | 10/1960 |
| JP | 08-142817 | 6/1996 |
| JP | 09-136559 | 5/1997 |

* cited by examiner

*Primary Examiner*—Richard Ridley
*Assistant Examiner*—Justin Krause
(74) *Attorney, Agent, or Firm*—Ostrolenk, Faber, Gerb & Soffen, LLP (57) ABSTRACT

An automobile accelerator and brake pedal device, which is a brake pedal device comprising a vertically operable brake pedal having an auxiliary pad connected thereto, a transversely operable accelerator pad disposed in the auxiliary pad, and acceleration mechanism driven by the accelerator pad, wherein the accelerator pad is in the form of a plate-like member and chevroned with the intermediate portion bulging outward, the acceleration mechanism being operated by the slope surface of the chevron. Even if the brake pedal (1) is stepped on with the accelerator in its active position, this stepping-on action necessarily causes the accelerator pad (9) to move forward together with the auxiliary pad (3), thereby immediately bringing the accelerator lever (10) back to its original inactive position without any time delay involved as when a different pedal is stepped on, putting off the accelerator, and enabling the brake function to act normally.

12 Claims, 5 Drawing Sheets

AUTOMOBILE ACCELERATOR AND BRAKE PEDAL DEVICE

CROSS REFERENCE TO RELATED APPLICATION

The present application is a 35 U.S.C. §371 national phase conversion of PCT/JP02/004794 filed May 17, 2002, which claims priority of Japanese Application No. 2001-156990 filed May 25, 2001.

TECHNICAL FIELD

The present invention relates to an automobile accelerator and brake pedal device having a transversely operable accelerator and a vertically operable brake pedal. Particularly, it relates to a pedal device that the brake pedal is operable by stepping on the brake pedal without returning the foot to the initial position, thus eliminating any time delay.

BACKGROUND ART

The inventor of the present invention has invented several automobile accelerator and brake pedal devices having a transversely operable accelerator and a vertically operable brake pedal. These pedal devices are disclosed in JP8-142817(A) and JP9-136559(A) as the representative ones.

These known pedal devices allow a driver's right foot only to operate the accelerator and brake pedal parts separately. Specifically assuming that the right foot is put on the pedal device in the rest position, the foot is made to turn clockwise about the heel for operating the accelerator pedal part. When the driver takes an instinctive stepping-on motion by reflex action in an emergency, the stepping-on action is applied on the brake pedal part of the device without fail. This effectively prevents the traffic accidents which would be caused by stepping on an accelerator pedal instead of a brake pedal by mistake in a conventional control system wherein both pedals are arranged apart from each other.

However, when braking the automobile equipped with the pedal device, the driver should turn counterclockwise his right foot about the heel to the rest or brake-operative position releasing the accelerator, and then he steps on the brake pedal part, thereby actuating the brake pedal part without mistakes. The switching from the accelerator-operative to brake-operative position causes a short, but still distinctive length of delay prior to the braking action.

Such a delay is much shorter than that caused by shifting the right foot from the accelerator to the brake pedal in the conventional or ordinary control system both pedals are arranged apart from each other. There might be, however, an occasion in which the short delay leads to a traffic accident.

Also, it is almost impossible to apply such strong operating force to the accelerator of the pedal device for clockwise turning as applied to the conventional stepping-on type accelerator. Even though a certain strength of force can be applied in a moment, it would be very difficult to apply the strength of force continuously for a while or repeatedly while driving; the driver would be tired from operating the composite pedal device while driving.

In view of the above, one object of the present invention is to provide an accelerator and brake pedal device which is so designed that the braking action can be attained instantly by stepping on the brake pedal without the necessity of turning the foot about the heel to the rest position and without any time delay.

Another object is to provide an accelerator and brake pedal device which is responsive to application of a reduced force for turning toward accelerator-operative position, thus facilitating operation of the accelerator.

DISCLOSURE OF INVENTION

An automobile accelerator and brake pedal device of the present invention is a brake pedal device comprising a vertically operable brake pedal having an auxiliary pad connected thereto, a transversely operable accelerator pad connected to the auxiliary pad, and acceleration mechanism driven by the accelerator pad, wherein the accelerator pad is in the form of a plate-like member and chevroned with the intermediate portion bulging outward, the acceleration mechanism being operated by the slope surface of the chevron. With this arrangement, even if the brake pedal is stepped on for braking the automobile while remaining the accelerator pad in an operative position, the accelerator pad advances together with the auxiliary pad advances to allow the accelerator lever returning to its original position instantly, thereby putting the accelerator inoperative and allowing the braking mechanism to work normally without any time delay.

The pivot of the accelerator lever is equipped with load reducing means to reduce a counter force applied from the accelerator wire arm to the accelerator lever. Thus, the accelerator lever can be responsive to an operating force of reduced strength for pulling up the acceleration wire via an associated acceleration wire arm, and hence actuating the accelerator. Advantageously this arrangement contributes to reduction of the operating force to be applied to the accelerator pad, thus improving the operativity.

BEST MODE FOR CARRYING OUT THE INVENTION

Referring to drawings, an automobile accelerator and brake pedal device of the present invention is described below.

Figure 1:
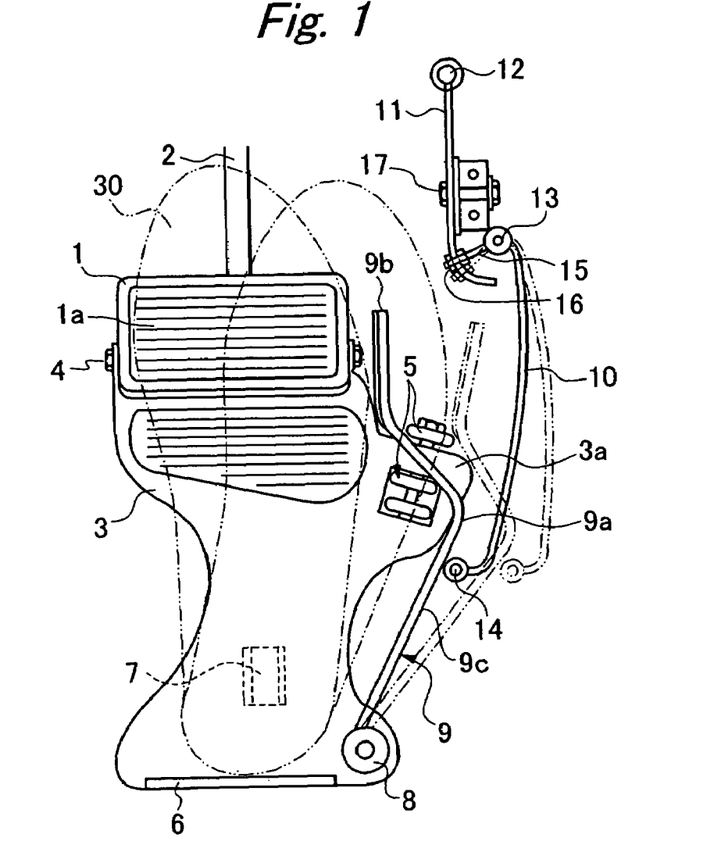
FIG. 1 is a schematic plan view of an automobile accelerator and brake pedal device according to a first embodiment of the present invention.

FIG. 1 is a schematic plan view of an automobile accelerator and brake pedal device. A brake pedal 1 of the device is an ordinary one such as found in an ordinary automobile in which the braking operation is made by stepping on. As is well known, such brake pedal 1 is fixed to one end of a brake arm 2, and the other end of the brake arm 2 is operatively connected to the braking system including a hydraulic device. A rubber sheet 1*a* is stuck on the surface of the brake pedal 1 to prevent a driver's shoe from slipping.

An auxiliary pad 3 is connected to the brake pedal 1 via a joint member 4 such as a bolt, and the auxiliary pad 3 has an outward-curved projection 3*a* formed on its right side. The outward-curved projection 3*a* has rolls 5 mounted thereon. These rolls 5 effectively reduce the friction which resists the rightward movement of the shoe from the brake pedal 1.

Also, the auxiliary pad 3 has a heel rest 6 standing upright on its rear side, and a pivot roll 7 mounted on its rear, bottom side.

An accelerator pad 9 is rotatably fixed to the rear and right upper surface of the auxiliary pad 3 via a pivot axle 8, so that it may rotate within a predetermined angular range. The accelerator pad 9 is in the form of a relatively wide plate-like member and chevroned with the intermediate portion bulging outward to form a summit 9*a*, and its free distal end 9*b* is formed flat to abut against the shoe.

The accelerator pad. 9 actuates an acceleration mechanism, which comprises an accelerator lever 10, an acceleration wire arm 11 and an acceleration wire 12. The accelerator lever 10 is somewhat curved, and is pivoted at its proximal end to rotate about a pivot axle 13. The accelerator lever 10 has a roll 14 fixed to its distal end, and the roll 14 is rotatably and/or slidably abutted on the slope 9*c*. In this particular embodiment, the accelerator pad 9 is shown as having a straight slope 9*c* to the summit 9*a*, but it may have a circular arc or curved length to the summit.

The accelerator lever 10 is bent at its proximal end at about 90 degrees to form an operating rod 15, which has a push roll 16 fixed to its end. The push roll 16 is abutted on one end of an acceleration wire arm 11 for operating the accelerator, as later described in details.

Figure 2:
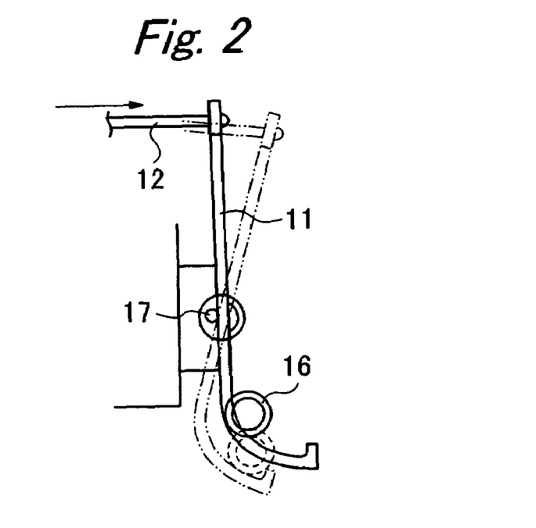
FIG. 2 is a schematic side view showing a principal part of an acceleration mechanism of the automobile accelerator and brake pedal device.

FIG. 2 is a schematic side view showing a principal part of an acceleration mechanism. The acceleration wire arm 11 is pivoted at its middle portion to rotate about the pivot 17 like a seesaw. The one end of the acceleration wire arm 11 for the push roll 16 to abut on is formed in the form of an arc of a circle around the pivot axle 13, and at the same time the one end is curved upward too. And the other end of the acceleration wire arm 11 is connected to the acceleration wire 12. The acceleration wire arm 12 is connected to the engine drive control as is the case with an ordinary accelerator pedal.

Figure 3:
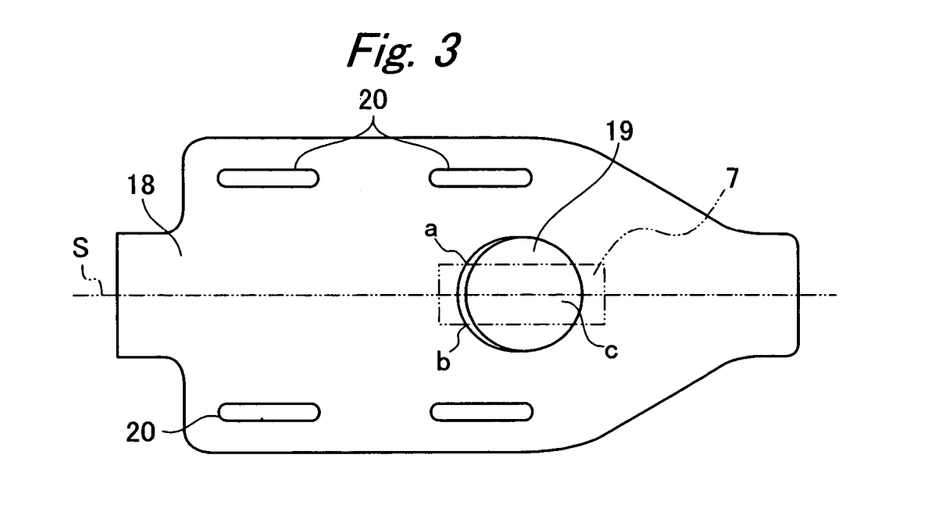
FIG. 3 is a plan view of a guide plate used in the automobile accelerator and brake pedal device.

FIG. 3 is a plan view of a guide plate 18 used in the automobile accelerator and brake pedal device. The guide plate 18 functions to control the pivot roll 7 in position. The pivot roll 7 is fixed to the bottom of the auxiliary pad 3, as described above. The guide plate 18 is, for example, made of a hard plastic flat plate and has a circular recess 19 formed close to the converging end, and a plurality of elongated holes 20 made on its opposite sides. The circular recess 19 is so made that its depth may gradually increase forward.

The elongated holes 20 permit the guide plate 18 to be adjustably changed in position when it is fixed to a floor of the automobile.

Figure 4:
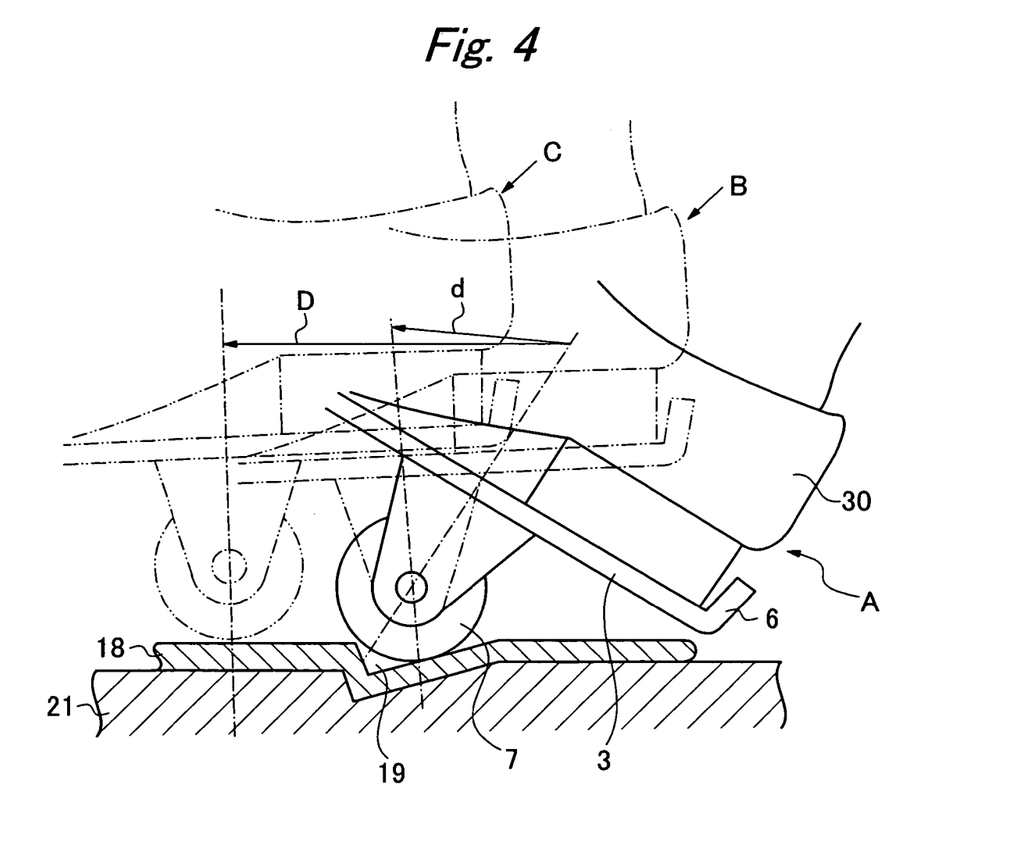
FIG. 4 is a partially enlarged side view, schematically illustrating how the braking action is taken in the automobile accelerator and brake pedal device.

FIG. 4 is a partially enlarged side view, schematically illustrating how the braking action is taken in the automobile accelerator and brake pedal device. The guide plate 18 is mounted on an automobile floor 21 so that the pivot roll 7 partly falls in the inclined circular recess 19, thereby the auxiliary pad 3 may be held stable in all directions.

Specifically, the pivot roll 7 abuts the inclined circular recess 19 at three points "a", "b" and "c" as shown in FIG. 3, so that it may be fixed in position in respect of longitudinal and lateral directions. If the auxiliary pad 3 were allowed to somewhat move back and forth, the brake lamps of the automobile would be apt to turn on to indicate that the automobile stops even when the accelerator is under operation, whereas if the auxiliary pad 3 were allowed to somewhat move left and right, the operation of the accelerator pad would become unreliable. The three-points hold of the auxiliary pad 3 assures that it is aligned with the centerline "S" of the guide plate 18, thereby completely eliminating the unstable operation.

The manner in which the automobile accelerator and brake pedal device is operated is described below. First, the inoperative rest position of the acceleration and braking is as shown with solid lines in FIG. 1. The brake pedal 1, accelerator pad 9, accelerator lever 10 and other associated parts are biased to the rest position all the time.

The driver puts his right foot with shoe 30 softly on the brake pedal 1 and auxiliary pad 3. When the engine starts, he turns his foot clockwise about the heel to push the flat end 9*b* of the accelerator pad 9, so that the accelerator pad 9 may turn clockwise about the pivot axle 8 to the accelerator-operative position. At the same time, the roll 14 of the accelerator lever 10 rolls on the slope 9*c* to the summit 9*a* of the chevroned accelerator pad 9. Accordingly, the accelerator lever 10 swings about the pivot axle 13, and hence, the operating rod 15 and the push roll 16 are displaced to the accelerator-operative position. It should be noted that the clockwise rotation of the chevroned accelerator pad 9 causes an amplified counterclockwise displacement of the roll 14 of the accelerator lever 10, and hence, an amplified rotating angle of the accelerator lever 10.

When the operating rod 15 and the push roll 16 are put in the accelerator-operative position, the push roll 16 pushes down the curved end of the acceleration wire arm 11 to swing the acceleration wire arm 11 like a seesaw, thereby pulling up the acceleration wire 12, as shown in FIG. 2. The more the acceleration wire 12 is pulled up, the more the automobile is accelerated. Thus, the driver can control acceleration degree of the automobile by adjustably turning his foot.

When the driver is going to brake the automobile while driving, he usually returns his foot in the original rest position, so that the accelerator may be put in inoperative position. Then, the driver steps on the brake pedal 1. Even though he forgot to return his foot to the original rest position and stepped on the brake pedal 1, he can brake.

Figure 5:
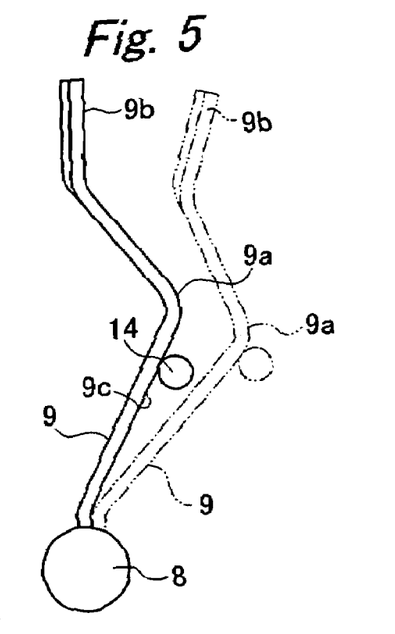
FIG. 5 illustrates how the accelerator pad moves from the inoperative position to the operative position in the automobile accelerator and brake pedal device.
Figure 6:
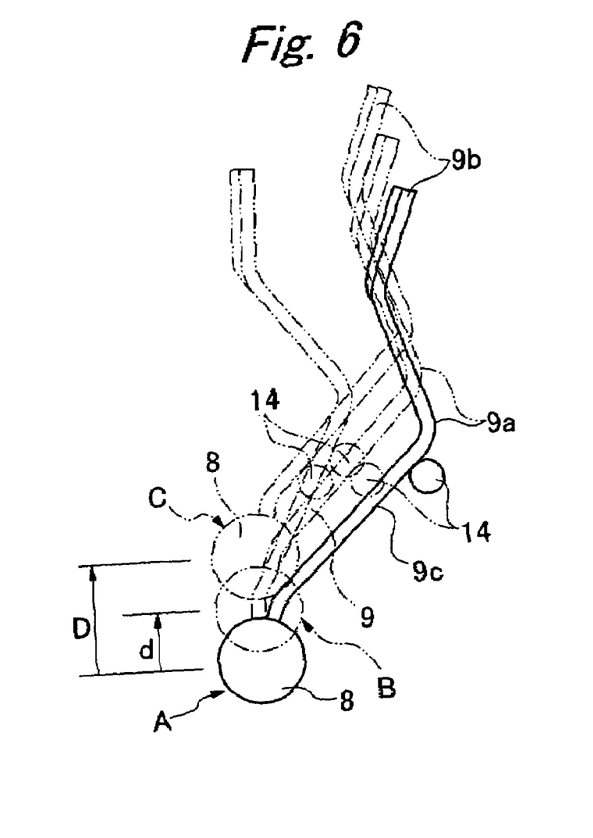
FIG. 6 illustrates how the accelerator pad moves to affect the acceleration mechanism in response to the stepping-on for braking while the automobile accelerator and brake pedal device remains in the accelerator-operative position.

Referring to FIGS. 4 to 6, the braking action is described below.

FIG. 5 illustrates how the accelerator pad moves from the inoperative rest position to the operative position, and FIG. 6 illustrates how the accelerator pad affects the accelerator pad mechanism in response to the stepping-on for braking in the accelerator-operative position.

First, the right foot is put on the brake pedal 1 and auxiliary pad 3 with the toe up so that the auxiliary pad 3 may incline up at a predetermined angle, as shown the position "A" with solid lines in FIG. 4. At the moment, the accelerator pad 9 and the roll 14 of the accelerator lever are made to turn toward the accelerator-operative position. Specifically, the accelerator pad 9 is pushed rightward, and the roll 14 is displaced close to the summit 9a of the chevroned accelerator pad 9, as is shown with phantom lines in FIG. 5.

Assuming that the driver steps on the brake pedal 1 in this position, the auxiliary pad 3 will incline about the pivot axle of the pivot roll 7 to move a distance "d" equal to the arc length of the rotation of the auxiliary pad 3, as shown the position "B" with phantom lines in FIG. 4. As a result, the position of the accelerator pad 9 changes from the position "A" as shown with solid lines in FIG. 6 to the position "B" as shown with phantom lines in FIG. 6, thus causing the roll 14 to roll down the slope 9c toward the pivot axle 8.

Then, the accelerator lever 10 is made to return to the accelerator-inoperative position in spite of the accelerator pad 9 remaining in the accelerator-operative position. Accordingly, the operating rod 15, push roll 16 and acceleration wire arm 11, which are ganged with the accelerator lever 10, return to the original accelerator-inoperative position. Thus, the accelerator is put in the inoperative position, so that the brake may work normally.

In case that the driver happens to abruptly step on the brake pedal in emergency while driving, he can step on abruptly and strongly the brake pedal 1 even with the accelerator pad 9 remaining in the accelerator-operative position, and then, the pivot roll 7 comes out of the circular recess 19, allowing the auxiliary pad 3 to advance a significant distance "D" as seen phantom lines "C" in FIG. 4.

Then, the accelerator pad 9 is moved the distance "D" from the position "A" as seen with the solid lines in FIG. 6 to the position "C" as seen with the phantom lines in FIG. 6, thereby making the roll 14 to roll down suddenly from the summit 9a close to the pivot axle 8 on the slope 9c of the accelerator pad 9. Thus, the accelerator lever 10 returns to the accelerator-inoperative position. Then, the brake can work normally.

As may be understood from the above, whatever the driver brakes slowly or quickly, as long as stepping on the brake pedal 1, the accelerator can be automatically shifted to inoperative position even in the accelerator-operative mode. Especially in emergency, the driver may only step on the brake pedal 1 without shifting his foot from the accelerator pad to the brake pedal as is required in the conventional control system. Thus, it can be eliminated the short delay which would be caused in shifting the foot from the accelerator to the bake pedal, and still advantageously the traffic accident which is caused by stepping on the wrong pedal can be completely avoided.

Figure 7:
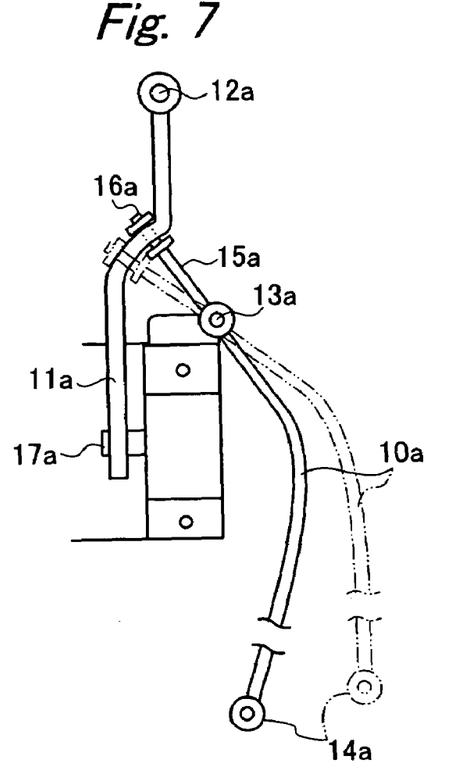
FIG. 7 is a plan view showing a principal part of an acceleration mechanism of an automobile accelerator and brake pedal device according to a second embodiment of the present invention.
Figure 8:
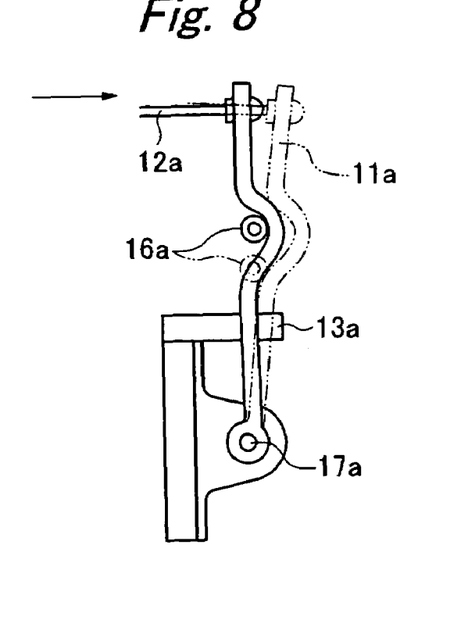
FIG. 8 is a side view of the principal part of the acceleration mechanism.

FIGS. 7 and 8 illustrate the second embodiment on the acceleration mechanism of the present invention. FIG. 7 is a plan view showing a principal part of the acceleration mechanism, and FIG. 8 is a side view showing the principal part of the acceleration mechanism. Each component part of the braking mechanism such as a brake pedal 1, an auxiliary pad 3, an accelerator pad 9 etc. are not shown and are not explained below to avoid repetition, since they are as same as in the first embodiment.

The acceleration mechanism of the second embodiment comprises an accelerator lever 10a, an acceleration wire arm 11a and an acceleration wire 12a, as is the case with the one in the first embodiment. The accelerator lever 10a is somewhat curved in shape, and can rotate about a pivot axle 13a positioned around its proximal end. The accelerator lever 10a has a roll 14a attached to its free distal end, and the roll 14a is rotatably and/or slidably abutted on the slope 9c of the accelerator pad 9, as is the case in the first embodiment.

The accelerator lever 10a has a substantially straight operating rod 15a extending beyond the pivot axle 13a. The operating rod 15a has a push roll 16a fixed to the free ends. The push roll 16a abuts on the middle portion of the acceleration wire arm 11a in order to operate it.

The acceleration wire arm 11a is pivotally connected at one end to a pivot axle 17a so as to be swingable about the axle 17a. The middle portion of the acceleration wire arm 11a on which the push roll 16a rides, is curved to define a circular arc having a center at the pivot axle 13a as shown in the plan view of FIG. 7, and is also curved to form a circular arc having inside surfaces on which the push roll 16a abuts, as shown in the side view of FIG. 8. The acceleration wire arm 11a has another end fixed to an end of the acceleration wire 12a, which is operatively connected to the engine drive control like the ordinary accelerator pedal.

In the acceleration mechanism of the second embodiment, the acceleration wire arm 11a turns or swings about its pivot 17a to pull up the acceleration wire 12a, in contrast with the seesaw movement of the acceleration wire arm 11 to pull up the acceleration wire 12 in the first embodiment. In either case, the acceleration wires 12, 12a can be pulled up by rotating the accelerator levers 10, 10a about the pivot axles 13, 13a, respectively, in response to the lateral movement of the accelerator pad 9.

In case that a driver brakes his automobile ordinarily, for instance at the crossing, the driver returns his right foot about the heel to the accelerator-inoperative position for the brake-operative position, and then he steps on the brake pedal 1 slowly. On the other hand, in case that a pedestrian suddenly rushes out in front of the running automobile and therefore it is necessary to brake abruptly the automobile, as long as stepping on the brake pedal 1 to the best of the driver's power without returning his foot and still remaining in the accelerator-operative position, the accelerator can be automatically shifted to inoperative position and the braking mechanism can work normally.

In either embodiment, the operation of the acceleration wire arm 11 is made by rotating the foot about the heel to move the accelerator pad 9 sideways. The pushing force applied to the accelerator pad 9 is weak, compared with that applied to the accelerator pedal by stepping on in the ordinary control system. Even if the driver can apply an increased pushing force to the accelerator pad on purpose, he will be tired from keeping such a strong push applied onto the accelerator pad while driving.

Therefore, it is required that the accelerator pad 9 can be operated with a driver's applying force being approximately one third or less of that required in the ordinary control system, with use of the principle of leverage to operate the accelerator lever 10. Especially, it may be reduced the applying force by establishing an appropriate ratio of the length of the accelerator lever 10, 10a rotating about the pivot axle 13, 13a to the length of the operating rod 15, 15a, where the appropriate ratio of the length of accelerator lever 10, 10a to the length of operating rod 15, 15a would be 4–5 to 1.

Although the applying force can be reduced with use of the principle of leverage, it causes the accelerator pad 9 and accelerator lever 10, 10a to lengthen in strokes, and it is difficult to permit too long strokes in the limited space available in the automobile. Also, it needs to be so designed as to prevent the driver from missing his step from the brake pedal 1, and that displacement of his foot beyond the auxiliary pad 3 should be limited to a certain extent.

Figure 9:
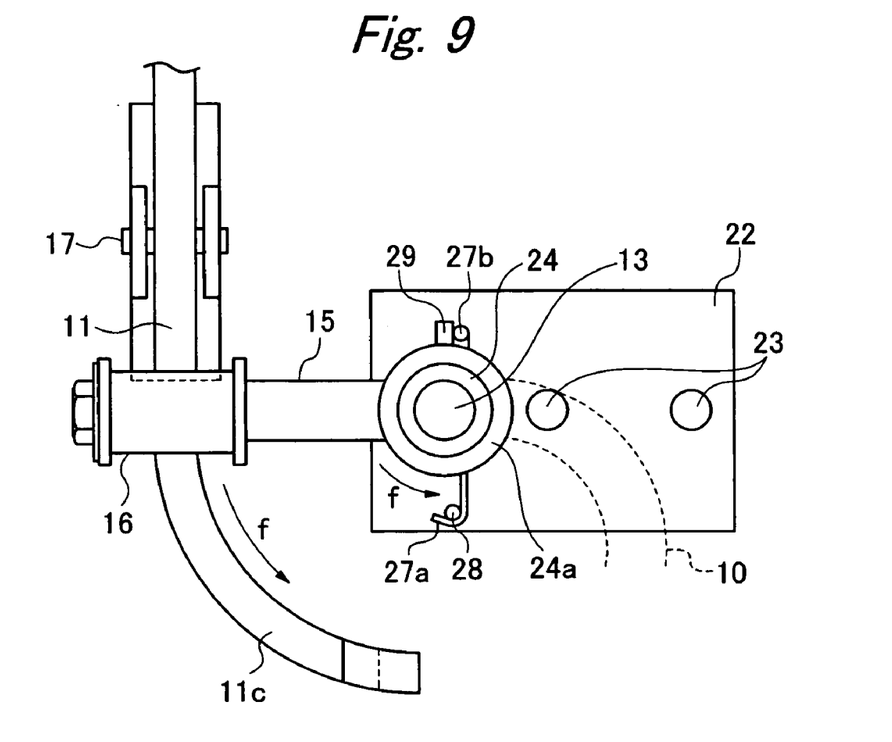
FIG. 9 is a schematic plan view of a drive transmission mechanism for operating the accelerator wire arm by the accelerator lever according to the first embodiment.
Figure 10:
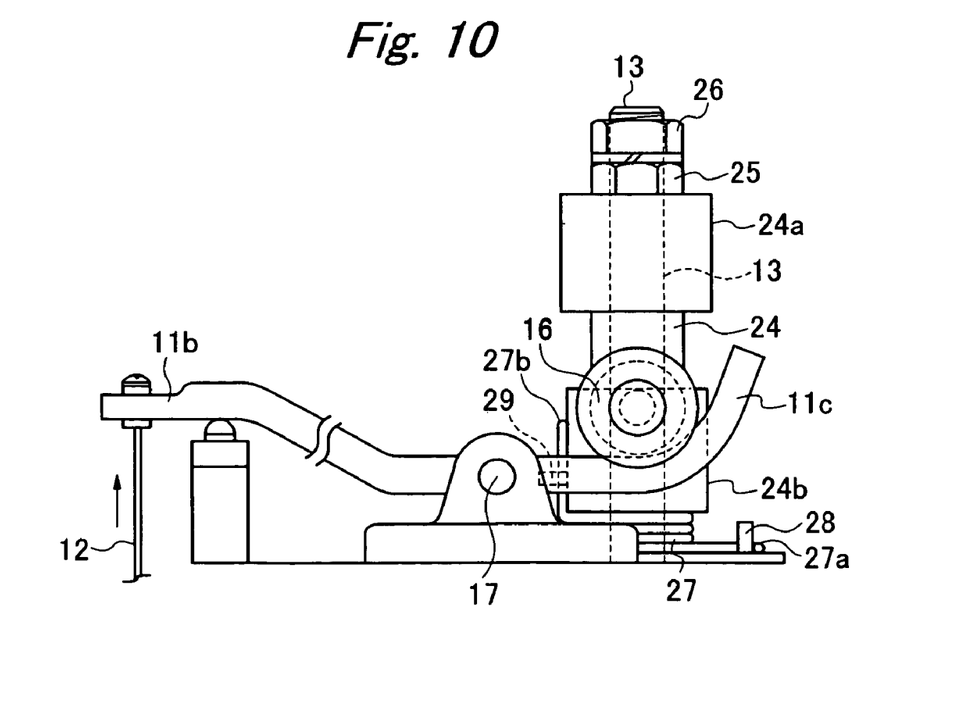
FIG. 10 is a side view of the drive transmission mechanism.

FIGS. 9 and 10 show some details of the drive transmission mechanism which makes the accelerator lever operate the accelerator wire arm in the first embodiment.

FIGS. 9 and 10 are a plan view and a side view of the drive transmission mechanism, respectively.

Referring to these drawings, the pivot axle 13 of the accelerator lever 10 stands upright on a base plate 22, which has two or more holes 23 for fastening the base plate 22 to the automobile floor with bolts.

A bearing tube 24 having upper and lower bulges 24a and 24b is rotatably fitted on the upright pivot axle 13, and two lock nuts 25 an 26 are threadedly engaged with the upper end of the pivot axle 13, thereby preventing the bearing tube 24 from coming up and leaving the pivot axle 13. The accelerator lever 10 is fixed to the upper bulge 24a, and the operating rod 15 is fixed to the lower bulge 24b. Thus, the accelerator lever 10 and the operating rod 15 are fixed rotatably to the pivot axle 13 via the bearing tube 24.

The accelerator wire arm 11 moves about the pivot 17 like a seesaw in response to the push given by the push roll 16 of the operating rod 15. The accelerator wire arm 11 is always spring-biased to descend the arm end at which the accelerator wire 12 is fixed, thereby putting the accelerator in inoperative position. The spring or resilient force is 2 to 3 kg strong, and 5 kg strong when occasion demands.

Acceleration varies with the pulled-out length of the accelerator wire 12. Acceleration cannot be easily controlled with accuracy if the fully pulled-out length of the accelerator wire is relatively short. It is, therefore, necessary that the fully pulled-out length or stroke of the accelerator wire is long enough to facilitate controlling acceleration. To meet this requirement, the pivot 17 about which the accelerator arm 11 moves like a seesaw is preferably so determined that the ratio of the length from a wire-attached end 11b to the pivot 17 to the roll-traveling length from the pivot 17 to a pushing end 11c is 2 to 1.

With this arrangement, the stroke of the wire-attached end 11b is twice as large as the stroke of the pushing end 11c, and accordingly acceleration can be easily controlled with accuracy. The pushing force on the pushing end 11c of the seesaw, however, needs to be twice or more (4 to 6 kg) as large as the pull-down force applied to the wire-attached end 11b.

As described above, the ratio of the length of accelerator lever 10 to the length of operating rod 15 is made 4–5 to 1, thereby reducing the operating force applied to the accelerator lever 10 to one fourth to one fifth. Thus, acceleration can be controlled by applying a force of about 1 kg or stronger to the accelerator pad 9 to move it sideways. Turning the foot about the heel while being loaded with one or more kg, however, is not easy.

With a view to reducing such a load, the pivot axle 13 is equipped with operating force or load reducing means 27, which functions to reduce the counter force from the accelerator wire arm 11. One example of such load reducing means 27 is a torsion spring, one end 27a of which is caught by a stud pin 28 standing upright on the base plate 22, and the other end of which is caught by a stud pin 29 standing upright on the bulge 24b of the bearing tube 24.

The load reducing means in the form of the torsion spring 27 urges the bearing tube counter-clockwise all the time, and hence the push roll 16 toward the operating end 11c as indicated by arrow "f" in FIG. 9. The resilient force of the torsion spring 27 is somewhat weaker than the returning force transmitted from the accelerator wire 12 to the operating end 11c of the accelerator wire arm 11, so that the accelerator wire 12 is not prevented from returning the position where the accelerator is released.

Assuming that the returning force applied to the operating end 11c is 4 kg strong, the resilient strength of the torsion spring 27 has only to be made 3 kg, the accelerator is allowed to return to be released under the influence of 1 kg (=4 kg minus 3 kg) force.

Due to the torsion spring 27, the strength of the force to be applied to the accelerator lever 10 to operate the accelerator wire arm 11 can be reduced four times, so that the accelerator pad 9 may be laterally operated by applying the force being as weak as substantially 250 grams or so. Still advantageously, the pull-up length of the accelerator wire 12 can be lengthened within the range where the pull-up length does not cause any problems in controlling the accelerator normally. Thus, the driver can lightly turn his toe about his heel in order to operate the accelerator pad 9. In other words, it remarkably develops operativity of the accelerator pad 9. The above description pertaining to the first embodiment can be equally applied to the second embodiment.

As may be understood from the above, the accelerator lever and the load reducing means work together to assure that the accelerator wire arm be put in its operative and inoperative position as required; and that the operating force applied to the accelerator pad and accelerator lever by turning the foot about the heel be substantially reduced.

INDUSTRIAL APPLICABILITY

As may be understood from the above, the automobile accelerator and brake pedal device of the present invention comprises a vertically operable brake pedal having an auxiliary pad connected thereto, a transversely operable accelerator pad disposed in the auxiliary pad, and acceleration mechanism driven by the accelerator pad, wherein the accelerator pad is in the form of a plate-like member and chevroned with the intermediate portion bulging outward, the acceleration mechanism being operated by the slope surface of the chevron. With this arrangement, even if the brake pedal is stepped on for braking the automobile while remaining the accelerator pad in an operative position, the accelerator pad advances together with the auxiliary pad advances to allow the accelerator lever returning to its original position instantly, thereby putting the accelerator inoperative and allowing the braking mechanism to work normally without any time delay. Also, this effectively prevents the traffic accident, which would be caused by stepping on the wrong pedal by mistake in emergency.

The invention claimed is:

1. An automobile accelerator and brake pedal device, the device comprising:
   a vertically operable brake pedal having an auxiliary pad connected thereto,
   a transversely operable accelerator pad connected to the auxiliary pad, and
   an acceleration mechanism driven by the accelerator pad through a slidably abutted roll member,
   wherein the accelerator pad is in the form of a chevron-shaped plate member with an intermediate portion bulging outward, the acceleration mechanism being operated by a slope surface of the intermediate portion operating on the roll member;
   and wherein in a first position of the brake pedal the acceleration mechanism operates in accordance with the position of the accelerator pad, and in a second depressed position of the brake pedal the roll member slides to an accelerator-inoperative position irrespective of the position of the accelerator pad.

2. An automobile accelerator and brake pedal device according to claim 1, wherein an accelerator lever is driven by the accelerator pad at the slope surface between a pivot axle and a summit of the plate.

3. An automobile accelerator and brake pedal device according to claim 1, wherein the auxiliary pad has a support roll fixed on its bottom and the device further comprises a guide plate fixed to an automobile floor, the guide plate having a recess made thereon for the support roll to fit therein for positioning.

4. An automobile accelerator and brake pedal device according to claim 1, wherein the accelerator pad is rotatably fixed to an end of the auxiliary pad through a pivot axle.

5. An automobile accelerator and brake pedal device according to claim 4, wherein the acceleration mechanism comprises an accelerator lever operatively connected to the accelerator pad, and an accelerator wire arm connected to an accelerator wire, thereby enabling the accelerator wire arm to pull up or push down the accelerator wire by the accelerator lever.

6. An automobile accelerator and brake pedal device according to claim 1, wherein the acceleration mechanism comprises an accelerator lever operatively connected to the accelerator pad, and an accelerator wire arm connected to an accelerator wire, thereby enabling the accelerator wire arm to pull up or push down the accelerator wire by the accelerator lever.

7. An automobile accelerator and brake pedal device according to claim 6, wherein the accelerator lever comprises a first part to be operated by the accelerator pad and a second part to operate the accelerator wire arm and is rotatable about a pivot positioned between said first part and said second part.

8. An automobile accelerator and brake pedal device according to claim 7, wherein a length ratio of the first part to the second part is 4–5 to 1.

9. An automobile accelerator and brake pedal device according to claim 7, wherein the second part of the accelerator lever is an operating rod having a push roll attached thereto for operating the accelerator wire arm.

10. An automobile accelerator and brake pedal device according to claim 7, wherein an end of the accelerator wire arm has an arc shape, the end of the wire arm being disposed around the pivot and being curved upward.

11. An automobile accelerator and brake pedal device comprising:

a vertically operable brake pedal having an auxiliary pad connected thereto, a transversely operable accelerator pad connected to the auxiliary pad, and an acceleration mechanism driven by the accelerator pad, wherein the accelerator pad is in the form of a chevron-shaped plate member with an intermediate portion bulging outward, the acceleration mechanism being operated by a slope surface of the intermediate portion;

wherein the acceleration mechanism comprises an accelerator lever operatively connected to the accelerator pad, and an accelerator wire arm connected to an accelerator wire, thereby enabling the accelerator wire arm to pull up or push down the accelerator wire by the accelerator lever;

wherein a pivot of the accelerator lever is equipped with a load reducing means to reduce a counter force applied from the accelerator wire arm to the accelerator lever.

12. An automobile accelerator and brake pedal device according to claim 11, wherein the load reducing means is in a torsion spring to urge the accelerator lever in a direction to operate the acceleration lever.

* * * * *